Oct. 4, 1966   C. A. RITCHIE   3,276,684

FISH WEIGHT COMPUTER

Filed May 13, 1964

INVENTOR.
CLARK A. RITCHIE
BY
LeBlanc and Shur
ATTORNEYS

United States Patent Office 3,276,684
Patented Oct. 4, 1966

3,276,684
FISH WEIGHT COMPUTER
Clark A. Ritchie, 1310 N. Broadway,
Oklahoma City, Okla.
Filed May 13, 1964, Ser. No. 367,016
10 Claims. (Cl. 235—70)

The present invention relates to calculators, and more particularly to a computer of the slide rule type, for calculating the weight of fish.

Many persons interested in calculating the weight of fish for professional or scientific reasons (ichthyologists) or merely for reasons associated with recreation have through the years performed many studies attempting to determine what relationships, if any, exist between the weight and length of various species of fish and, further, whether any of these relationships were applicable to fish generally. At present, one of the most widely accepted relationships is the following:

$$W = CL^N$$

wherein $W$ = the weight of a fish $C$ = a constant variously referred to as either the condition index, the coefficient of condition, the condition factor or the ponderal index—it is an index which fishery biologists have used in describing the condition, plumpness or health of a fish. Relatively thin fish will have low condition indices whereas relatively plump fish will have higher condition indices. It has been found that within the same species, the weight of a relatively plump fish, regardless of length, may be calculated from the above formula using the condition index empirically found to be applicable to fish of that species.

$L$ = the length of a fish which may be defined in several ways, as follows (reference: Handbook of Freshwater Fishery Biology with the First Supplement, Carlander, 1953):

Standard length (S.L.)—essentially the length of a fish from the tip of the snout to the end of the vertebral column;

Fork length (F.L)—essentially the length from the tip of the snout to the end of the rays in the center of the caudal fin; and Total length (T.L.)—essentially the distance from the tip of the head (jaws closed) to the tip of the tail with the lobes compressed to give the maximum possible measurement.

$N$ = an empirically found figure found to be approximately 3.

Myriads of calculations based upon the above formula have been made, the results of which appear in texts in the form of tables. Difficulties, however, beset persons wishing to utilize this information with any degree of facility. Before this can be done it is necessary for such persons to first have available such a text; secondly, they must be acquainted with the use thereof. The latter point is one which may present problems even for an accomplished ichthyologist inasmuch as, depending upon the units (e.g., English or metric) and lengths (S.L., F.L., or T.L.) being used, rather complex conversion steps are required to interpret the compiled data. For example, where the condition index is known only on the basis of weights and lengths, in grams and millimeters respectively (the condition index under these circumstances generally being referred to as K), a presently accepted way of calculating this index when the weights and/or lengths known are in pounds and inches (the condition index under these circumstances generally being referred to as C) is by means of the following equation:

$$C = 36.1 r^3 \left( \frac{W 10^5}{L^N} \right)$$

wherein C, W, L and N have been previously defined and wherein $r$ = the ratio of S.L. to T.L. or F.L. depending on which accepted value of L is being used.

The need for and advantages of a simple and inexpensive computer which may enable even the sportsman to solve with facility the above calculations for many different species of fish has been manifest for a considerable time. This need has been evidenced by ichthyologists, hatchery people and even by judges in fishing contests. In the lattermost situation, there is frequently a need for a means by which unusually high weight deviations from the norm, for a given length fish of a certain species, can be rapidly checked so as to assess the possibility of artificial supplementation of weight to the fish in question. Yet, in the face of this need, there is no known rapid calculator of the sort contemplated by the present invention which solves all the foregoing specifically enumerated problems, and others.

The present invention contemplates a novel calculator which provides an effective means for quickly approximating, to a high degree of accuracy, the weight of a wide variety of fish from the smallest fry to the largest whales, so as to acceptably solve the foregoing problems by a single operation. Moreover, this inexpensive new computer renders such an operation routine so that it may be carried out with but a few seconds instruction by an operator with little knowledge of fish or calculators.

It is therefore a primary purpose of the present invention to provide a novel fish weight calculator which is adaptable to almost any fish weight problem, and effectively solves the above-discussed problems in rendering possible quick, easy fish weight calculations.

It is a principal object of the present invention to provide a fish weight calculator which provides for the direct calculation of substantially accurate fish weight when the type of fish and its length are known.

It is another object of the present invention to provide a computer which is able to directly calculate the weight of many different types of fish.

It is still another object of the present invention to provide a computer which can be quickly and easily operated with little training by an inexperienced operator so as to give accurate results.

It is a further object of the present invention to provide a computer which is of simple construction with a minimum of close tolerance parts, so that the computer is of close tolerance parts, so that the computer is of economical and commercially feasible construction. K and C are proportioned to the Index Number used on the slide rule, either directly or logarithmically depending on convenient usage. Such K and C scales can if desired be used in place of or in conjunction with the Fisk Index Scale.

Further objects and advantages of the present invention will be apparent from the following description, reference being had therein to the accompanying drawings wherein preferred embodiments of the invention are shown. In the drawings:

FIGURE 1 is a top plan view of a preferred embodiment of the computer constructed in accordance with the present invention.

FIGURE 2 is a top plan view of the reverse side of a preferred embodiment of the computer constructed in accordance with the present invention.

FIGURE 3 is a sectional view taken along line 3—3 of FIGURE 2.

FIGURE 4 is a graph related to the method of constructing a computer in accordance with the present invention.

The fish weight calculator of this invention comprises a straight element movable relative to two other fixed elements. The weight of any fish may be calculated by correctly positioning the slidable element with respect to the fixed elements and in particular with respect to a special scale on one of the fixed elements. The weight of the fish in question is then indicated on a weight scale on one of the fixed bars, opposite the fish-length designation, applicable to the fish in question, on a length scale printed on the sliding bar.

Basic construction

Referring to the drawings, and more particularly to the preferred embodiment of FIGURES 1-3, the numerals 11 and 12 indicate the upper and lower fixed members of the calculator of this invention indicated generally by the numeral 10. These members are held in predetermined spaced relation by any suitable spacing means, 16 and 18, either integral with or separately attached to fixed members 11 and 12. Slidably associated with fixed members 11 and 12 is slide 14.

Spanning both sides of fixed members 11 and 12, and slide 14 is runner 20, which, while disclosed incorporating spring element 21, may be of any suitable construction. Provided on runner 14 are the customary hair lines 22 and 23.

Referring particularly to FIGURE 3, tongues 40 and 42 are provided on members 11 and 12, respectively, and member 14 has grooves 36 and 38 extending along opposite sides thereof for receiving tongues 40 and 42 respectively. Of course, the tongues and grooves may be positioned on the slide and fixed member respectively, if desired.

The weight and length scales

Referring particularly to FIGURES 1 and 2, a logarithmic weight scale is provided on fixed member 12 and a logarithmic length scale 28 is provided on the lower portion of slide member 14. The construction of these scales is based on the base equation $W=CL^N$ wherein N is approximately 2.94. The exact value of N for any particular fish, however, may vary silghtly. For this reason, means described below are provided to indicate the expected deviations in weight resulting from an N factor slightly at variance from 2.94. The weight and length scales 26 and 28, respectively, shown in FIGURE 2, are extensions of similar scales shown in FIGURE 1. The specific weight and length scales shown in FIGURES 1 and 2 may obviously be made to cover broader or narrower ranges of weight and lengths if desired; for example, a scientific rule might have length scales from ½″ or 1″ to over 100′ to cover everything from the smallest fry to the largest whales. Also, for hatchery people there can be a reciprocal scale, e.g., below 1 pound, to show the number of fingerlings or fry per pound.

The index scale

The construction and positioning of index scale 30 and pointer 32, and the significance of the index numbers assigned to particular fish, along with their comparative relationship with weight and length scales 26 and 28, respectively, comprise one of the significant aspects of the instant invention.

Index scale 30 may be constructed as follows:

First, plots may be made on log-log paper of data relating to various species of fish. These plots, when combined in a single multi-plot graph, will reveal a series of spaced but substantially parallel lines each having a slope of approximately 3. Two such plots are schematically shown in FIGURE 4 at 42 and 44.

Second, the linear spacing between the plots relating to one of the slenderest fish (e.g., that relating to sailfish) and the stockiest fish (e.g., that relating to sunfish) may be measured and a line drawn of length equal to this spacing. In FIGURE 4, line 42 may be considered the sunfish plot and line 44 the sailfish plot. The spacing between these lines is indicated at 46.

Third, this spacing line 46 may then be divided into a number of equally spaced units. In the disclosed preferred embodiment the spacing line 46 was arbitrarily assigned a length of 88 units. The length of this line may then be extended, as at $a$ and $b$ in FIGURE 4 so as to be of such total length that the ratio of its total length to that of the first mentioned spacing line 46 is 100:88. The total length of this line, hereinafter referred to as the index number line, may then be divided into one hundred equal units.

Fourth, the index number line may then be related to the multi-plot graph previously mentioned. In the preferred embodiment, the index number line was arbitrarily so related with respect to the multi-plot graph that it intersected the Atlantic sailfish plot at division number 5 and the sunfish plot at division number 92. These numbers may then be assigned to these types of fish and become their index numbers for the purposes of this invention. The numbers 5 and 92 may be used for sailfish and sunfish respectively so as to permit weight-length plots of data relating to extremely slender or plump fish to most probably intersect the index number line within the ranges of divisions numbered 1–4 or 93–100 and for other reasons to be explained, anon.

Fifth, the relationship between the logarithmic weight-length plots for various other types of fish may then be determined and index numbers assigned thereto.

Sixth, the dimensions of index scale 30, as used on the calculator, are made such that when they are related to the dimensions of weight and length scales 28 and 26 this relationship is proportional to the relationship existing between the corresponding dimensions of spacing 46 and the logarithmic weight and length scales used in plotting lines 42 and 44. It will be noted that with index scale 30 constructed and related to weight length scales 28 and 26 in this manner it may be conveniently located for ready readability and utilization of the computer on the upper fixed member 11 midway between the ends thereof, as shown in FIGURE 2. This positioning of the index scale on the upper fixed member is made possible by means of the aforediscussed manner of constructing the index scale.

To facilitate a correlation between index scale numbers and, in particular, length scale 28, index arrow 32 may then be positioned as shown in FIGURE 2. Again because of the previously discussed construction and positioning of index scale 30, index arrow 32 is conveniently located at a point midway between the ends of the upper surface of slide 14. In the preferred embodiment, when slide 14 is not in an extended position relative to fixed members 11 and 12, index arrow 32 will accordingly be directly opposed to the center point (i.e., index number 50) of index scale 30.

As to several types of fish it will be found that no clear weight-length plot is available and, accordingly, no single index number assignable thereto. For example, in the listing of types of fish and their related index numbers, shown generally at 25, there are a series of index numbers (shown in FIGURE 2 at 27), assigned to the "Muskalunge." In this regard it should be noted that the accuracy of the calculations made by the computer of this invention may be controlled as desired. For example, special index numbers may be assigned to different types of closely related fish. See FIGURE 2, where, e.g., the species trout is subdivided into lake and rainbow trout, having index numbers of respectively 60 and 64—obviously, the subdivision could be carried even further, if desired, to include brown trout, golden trout, hatchery trout, etc.

Principle of operation

To determine the weight of any particular species to which an index number has been assigned, slide 14 is moved until fish index number arrow 32 is set below the pertinent index number. The weight of the fish will then appear on scale 26 below the length of the fish in question as it appears on scale 28.

It is obvious that the above calculator may be made in various sizes. Accordingly, the main and subsidiary markings on the scales thereof may be varied in number and scope as desired. Similarly, the computer of this invention can be configured as a circular or spiral slide rule.

Referring again to FIGURE 4, spacing line 46 plus the two extensions *a* and *b* may be designated as having a total length of 100 and then be divided into units logarithmically. Then index numbers are arrived at using the slide rule as discussed above in connection with linear index scale 30.

It will be apparent from the foregoing that the present invention provides a novel fish weight computer that is adaptable to facilitate the direct computation of fish weight; that it is an instrument of value both for scientific and nonscientific purposes; and that it embodies simple, inexpensive scales and indicator means to achieve the aforementioned adaptability and versatility.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed and desired to be secured by United States Letters Patent is:

1. A fish weight computer comprising a first member having a logarithmic weight scale thereon; a second member having a logarithmic length scale in opposed relation to said weight scale; a third member having an index scale including a plurality of equally spaced units, each unit having significance with relation to a particular species of fish; means for connecting said first and third members so as to permit said second member to be movable relative thereto; pointer means on said second member in opposed relation to said index scale, said scales and said pointer means being of such length and so related that when said pointer means is positioned in opposed relation to any particular unit designation on the index scale of said third member, the weight of any particular fish included in the group to which the said particular unit description relates is indicated on the said weight scale immediately opposed to the length of that particular fish indicated on said length scale.

2. A calculator as defined in claim 1, wherein said weight scale is of approximately one hundred pound span and wherein said length scale is of approximately one hundred inch span.

3. A calculator as defined in claim 1, further comprising means associated with said index scale indicating to which group of fish one or more units on said scale relates.

4. A calculator as defined in claim 3, further comprising additional weight and length scales on the first and second member respectively of at least five ton and thirty-five foot spans respectively.

5. A calculator as defined in claim 4, wherein said weight and length scales are calibrated in the metric system, and any other mensuration system.

6. A fish weight calculator comprising a first member having an index scale including a plurality of equally spaced fish-grouping calibrations thereon; a second member movable with repsect to said first member having pointer means thereon in opposed relation to said calibrations, said second member also having a logarithmic length scale; a third member with which said second member is also movably related; a logarithmic weight scale calibrated on said third member in opposed relation to said length scale for indicating the weight of a fish of predetermined length and fish-grouping according to the relative displacement of said pointer means and length scale with respect to said index scale and said weight scale.

7. A calculator for determining fish weights comprising first and second fixed members; a third member in slidable engagement therewith, said first fixed member having calibrated thereon a first logarithmic scale relating to the weight of a fish, said third member having calibrated thereon, juxtaposed to said weight scale, a second logarithmic scale relating to the length of said fish, said second fixed member having calibrated thereon a scale of equally spaced index indicia, said indicia relating individually to different groups of fish; an index indicia arrow postioned on said slide member juxtaposed to said scale of index indicia so that when said index arrow is positioned immediately juxtaposed to the index indicia on said second fixed member relating to a particular fish, the weight of that fish will be indicated on said first fixed member's scale at a point immediately juxtaposed to the length of said particular fish.

8. A calculator as defined in claim 7, wherein said index indicia comprise consecutively numbered calibrations.

9. A calculator as defined in claim 8, wherein said index indicia relate to the relative plumpness of a species of fish as compared to other groups of fish.

10. A calculator as defined in claim 8, further comprising a transparent runner straddling said first and second fixed members and said slide member, said runner including a hairline to facilitate the accurate location of indicia on said calculator's scales.

References Cited by the Examiner

UNITED STATES PATENTS

| | | | |
|---|---|---|---|
| 2,173,459 | 9/1939 | Van Doormaal | 235—70 |
| 2,452,417 | 10/1948 | Zentis | 235—70 |
| 2,534,695 | 12/1950 | Bland | 235—70 |
| 2,773,415 | 12/1956 | Wolfe | 235—70.1 X |
| 2,956,743 | 10/1960 | Davey | 235—70 |
| 3,146,942 | 9/1964 | Gaudier-Pons | 235—70 |

OTHER REFERENCES

Greenwood, G. W.: "Making of Special Slide Rules," Mechanical Engineering, vol. 47, pp. 1002–1006, section 2, November 1925.

Arnold, J. N.: Special Slide Rules, Purdue University, Lafayette, Ind., September 1933, p. 986.

Canada, A. H.: "Simplified Calculation of Black-body Radiation," General Electric Review, December 1948, pp. 50–54.

Makowski, M. W.: "A Slide Rule for Radiation Calculations," Review of Scientific Instruments, vol. 20, No. 12, pp. 876–884, December 1949.

Cosh, T. A.: "An Exposure Calculator for Isotope Radiography," Journal of Scientific Instruments, 329–332, vol. 34, August 1957.

Cajori, F.: A History of the Logarithmic Slide Rule and Allied Instruments, N.Y., The Engineering News Publishing Co.

RICHARD B. WILKINSON, *Primary Examiner.*

LEYLAND M. MARTIN, LEO SMILOW, *Examiners.*

C. G. COVELL, *Assistant Examiner.*